US010078241B2

(12) United States Patent
Hao

(10) Patent No.: US 10,078,241 B2
(45) Date of Patent: Sep. 18, 2018

(54) LIQUID CRYSTAL DISPLAY APPARATUS AND COLOR FILTER THEREOF

(71) Applicant: SHENZHEN CHINA STAR OPTOELECTRONICS TECHNOLOGY CO., LTD., Shenzhen (CN)

(72) Inventor: Sikun Hao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 194 days.

(21) Appl. No.: 14/905,299

(22) PCT Filed: Dec. 30, 2015

(86) PCT No.: PCT/CN2015/099715
§ 371 (c)(1),
(2) Date: Jan. 15, 2016

(87) PCT Pub. No.: WO2017/071091
PCT Pub. Date: May 4, 2017

(65) Prior Publication Data
US 2017/0227812 A1 Aug. 10, 2017

(30) Foreign Application Priority Data
Oct. 27, 2015 (CN) .......................... 2015 1 0708856

(51) Int. Cl.
*G02F 1/1335* (2006.01)

(52) U.S. Cl.
CPC .. *G02F 1/133514* (2013.01); *G02F 1/133512* (2013.01)

(58) Field of Classification Search
CPC ................................................ G02F 1/133514
See application file for complete search history.

(56) References Cited

U.S. PATENT DOCUMENTS

2012/0169977 A1* 7/2012 Tsubata .................. G02B 5/201 349/106
2012/0268700 A1* 10/2012 Shu ....................... G03F 7/0007 349/106
(Continued)

FOREIGN PATENT DOCUMENTS

CN 1982924 A 6/2007
CN 102707352 A 10/2012
(Continued)

OTHER PUBLICATIONS

Office Action issued in corresponding CN Application No. 201510708856 dated Sep. 29, 2017 (8 pages).

*Primary Examiner* — Edmond Lau
(74) *Attorney, Agent, or Firm* — Osha Liang LLP

(57) ABSTRACT

A scan driving method for a display panel is disclosed. The color filter includes a plurality of color filter units and a black matrix layer. The color filter units are arranged in a matrix form, and the position of each color filter unit corresponds to that of a sub-pixel unit of a liquid crystal display apparatus. The black matrix layer is formed between the color filter units, and a cross section of the black matrix layer between two adjacent color filter units has an upper portion with a larger width and a lower portion with a smaller width.

5 Claims, 4 Drawing Sheets

210B
210A
11
12
10

(56) References Cited

U.S. PATENT DOCUMENTS

2015/0253620 A1* 9/2015 Yang ................. G02F 1/133516
349/106
2016/0131937 A1* 5/2016 Yang ..................... G02F 1/1368
349/42
2016/0377901 A1* 12/2016 Yen ..................... G02F 1/13394
359/891

FOREIGN PATENT DOCUMENTS

| | | | |
|---|---|---|---|
| CN | 103941466 | A | 7/2014 |
| CN | 104656306 | A | 5/2015 |
| CN | 104834124 | A | 8/2015 |
| JP | H10206622 | A | 8/1998 |

* cited by examiner

LIQUID CRYSTAL DISPLAY APPARATUS AND COLOR FILTER THEREOF

BACKGROUND OF THE INVENTION

Field of the Invention

The present invention relates to the field of liquid crystal display, and more particularly to a liquid crystal display apparatus and a color filter thereof.

Description of the Related Art

Liquid crystal display apparatuses have advantages of lower power consumption, being thinner, having high resolution, and therefore become the mainstream of display industry. With the development of liquid crystal display technologies, liquid crystal display apparatuses are asked to be in a higher level in display quality, such as wide-color gamut, less color-shifting, and narrow frame.

Viewing angle characteristic is an important criterion of the image display quality of a liquid crystal display apparatus. There are many factors that will affect viewing angle characteristic, such as different display types (such as TN type, VA type, IPS type) of liquid crystal, the structure of pixel or the accuracy of manufacturing process.

FIG. 1 illustrates a partial cross-sectional view of a conventional liquid crystal display device, wherein a color filter of the liquid crystal display apparatus includes a plurality of color filter units. There are black matrix formed on the boundary between the adjacent color filter units for reducing light leakage and increasing contrast ratio. As shown in the figure, when watching the liquid crystal display apparatus with a lager viewing angle (such as within the angle range limited by the line L in FIG. 1), a user will receive light transmitted from other adjacent pixel areas in a single pixel area, thereby perceiving color shift phenomenon which affects visual quality.

Therefore, it is necessary to provide a liquid crystal display apparatus and a color filter thereof to overcome the problems existing in the conventional technology.

SUMMARY OF THE INVENTION

In view of the shortcomings of the conventional technology, a main objective of the present invention is to provide a liquid crystal display apparatus and a color filter thereof so that the color shift problem of the conventional color filter at large viewing angles can be solved.

In order to achieve the above-mentioned objective of the present invention, a color filter is provided. The structure of the color filter includes: a plurality color filter units being arranged in a matrix form, wherein the position of each color filter unit corresponds to that of a sub-pixel unit of a liquid crystal display apparatus; and a black matrix layer being formed between the color filter units, wherein a cross section of the black matrix layer between two adjacent color filter units has an upper portion with a larger width and a lower portion with a smaller width.

In one embodiment of the present invention, the color filter units are arranged into a plurality of rows, where in each row of the color filter units, the cross section of the black matrix layer between two adjacent color filter units has the upper portion and the lower portion.

In one embodiment of the present invention, the color filter units include red color filter units, blue color filter units, and green color filter units; the red color filter units, the blue color filter units and the green color filter units are alternately arranged along a row direction.

In one embodiment of the present invention, the upper portion of the cross section of the black matrix layer has a larger rectangular shape; and the lower portion has a smaller rectangular shape.

In one embodiment of the present invention, the upper portion of the cross section of the black matrix layer has a larger rectangular shape; and the lower portion has a trapezoidal shape; a top base side of the trapezoidal shape is connected to the upper portion, wherein a length of the top base side of the trapezoidal shape is greater than that of a bottom base side of the trapezoidal shape.

In one embodiment of the present invention, the lower portion of the cross section of the black matrix layer has an arc-shaped concave on both sides.

In one embodiment of the present invention, the upper portion and the lower portion of the cross section of the black matrix layer together are a trapezoidal shape as a whole.

In one embodiment of the present invention, the upper portion of the cross section of the black matrix layer has an arc-shaped concave on both sides; and the lower portion has a rectangular shape.

The present invention further discloses a liquid crystal display apparatus which includes the aforementioned color filter.

The present invention is mainly to form a black matrix layer between adjacent color filter units, wherein the black matrix, in cross section, has an upper portion and a lower portion with different widths. In this way, compared with conventional color filters, the lower portion which protrudes outward with respect to the upper portion is able to block light coming from the other adjacent pixel areas under large viewing angles, and thereby improving color shift under large viewing angles and enhancing display quality of liquid crystal display apparatus.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions with reference to the accompanying drawings, so that the used directional terms are used to describe and understand the present invention, but the present invention is not limited thereto.

Figure 1:
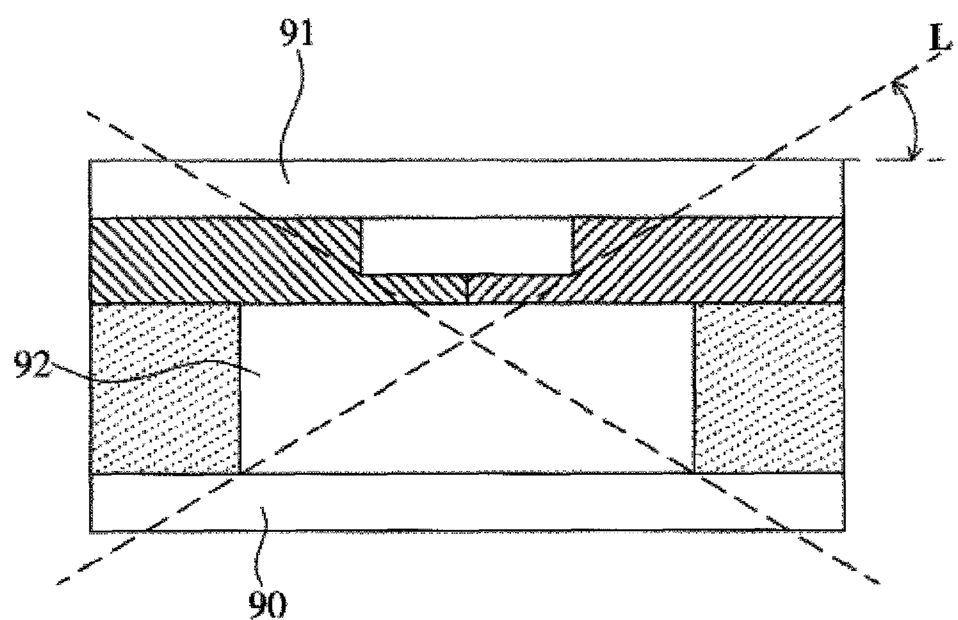
FIG. 1 is a schematic diagram showing a partial cross-sectional view of a conventional liquid crystal display device.
Figure 2:
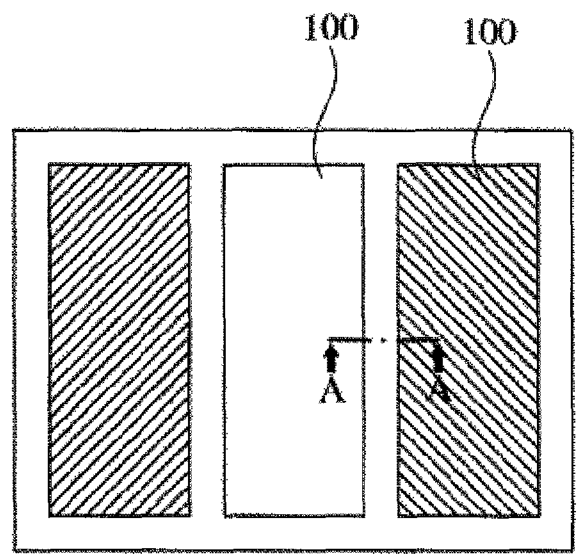
FIG. 2 is a schematic diagram showing a pixel structure of a liquid crystal display apparatus according to an embodiment of the present invention.
Figure 3:
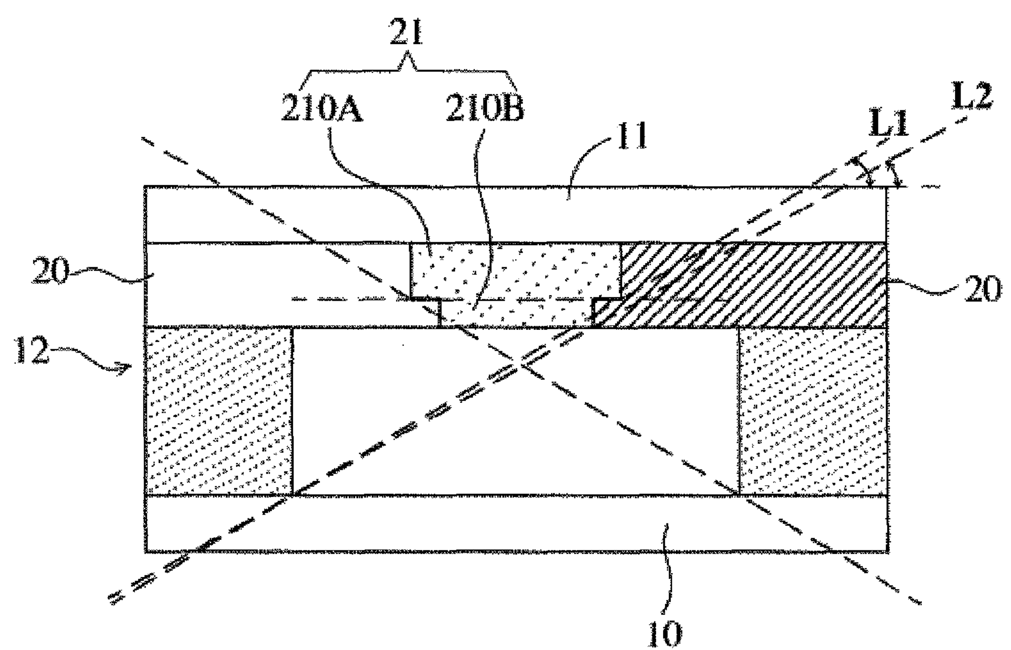
FIG. 3 is a partial cross-sectional view, taken along the line AA in FIG. 2, of the liquid crystal display apparatus according to a first embodiment of the present invention.

With reference to FIG. 2 and FIG. 3, FIG. 2 is a schematic diagram showing a pixel structure of a liquid crystal display apparatus according to an embodiment of the present invention; FIG. 3 is a partial cross-sectional view, taken along the line AA in FIG. 2, of the liquid crystal display apparatus according to a first embodiment of the present invention. The liquid crystal display apparatus may be a thin-film transistor liquid crystal display apparatus, but is not limited thereto. As shown in FIG. 3, the liquid crystal display apparatus basically includes a first substrate 10, a second substrate 11 opposite to the first substrate, and a liquid crystal layer 12 mounted between the substrates. The liquid crystal display apparatus has a pixel array, as shown in FIG. 2, which comprises a plurality of sub-pixel units 100 arranged in a matrix form. In general, each of the sub-pixel units 100 corresponds to a thin-film transistor unit. By controlling the switching of the thin-film transistor unit, the corresponding sub-pixel unit 100 can be controlled to display its corresponding colored light. In one embodiment, three adjacent sub-pixel units 100 may display different colored light, respectively, such as red, green, and blue, so as to form a pixel unit.

As shown in FIG. 3, in order to make the sub-pixel unit 100 to display a specific colored light, the liquid crystal display apparatus further comprises a color filter 2 which is mounted on one of the substrates, such as the second substrate 11. The color filter 2 may be formed by photoresists with different colors, and mainly includes a plurality of color filter units 20 and a black matrix layer 21.

The color filter units 20 are arranged in a matrix form, wherein the position of each color filter unit 20 corresponds to that of a sub-pixel unit 100 of the liquid crystal display apparatus. In one embodiment, the color filter units 20 may include red color filter units, blue color filter units, and green color filter units. In a preferred embodiment, the red color filter units, the blue color filter units and the green color filter units are alternately arranged along a row direction. Therefore, the color filter units 20 may be seen as being arranged into a plurality of rows. By switching on the sub-pixel unit 100, light emitted from a backlight source of the liquid crystal display apparatus will pass through the color filter unit 20 to which the sub-pixel unit 100 corresponds, and thereby forming specific colored light.

As shown in FIG. 3, the black matrix layer 21 is formed between the color filter units 20, wherein a cross section of the black matrix layer 21 between two adjacent color filter units 20 has an upper portion 210A with a larger width and a lower portion 210B with a smaller width. In more details, in each row of the color filter units 20, the cross section of the black matrix layer 21 between two adjacent color filter units 20 has the upper portion 210A and the lower portion 210B.

In the embodiment shown in FIG. 3, the upper portion 210A of the cross section of the black matrix layer 21 has a larger rectangular shape; and the lower portion 210B has a smaller rectangular shape.

In FIG. 3, an imaginary line L1 represents a border line where a conventional liquid crystal display apparatus would have color shift phenomenon; an imaginary line L2 represents a border line where the liquid crystal display apparatus of the present invention would have the color shift phenomenon. It can be seen from the comparison between line L1 and line L2 in FIG. 3 that the lower portion 210B extended from the black matrix layer 21 contribute to blocking light transmitting from other adjacent pixel areas under large viewing angles. In other words, the range of the viewing angle of the liquid crystal display apparatus where no color shifting would occur is thus widened, and thereby enhancing the display quality of images.

The foregoing black matrix layer 21 may be realized by one-time exposure and development using a gray-tone mask manufacturing process or a half-tone mask manufacturing process without any other additional processes.

Except for the above embodiment, the upper portion and the lower portion of the cross section of the black matrix layer 21 may be realized through the following embodiments.

Figure 4:
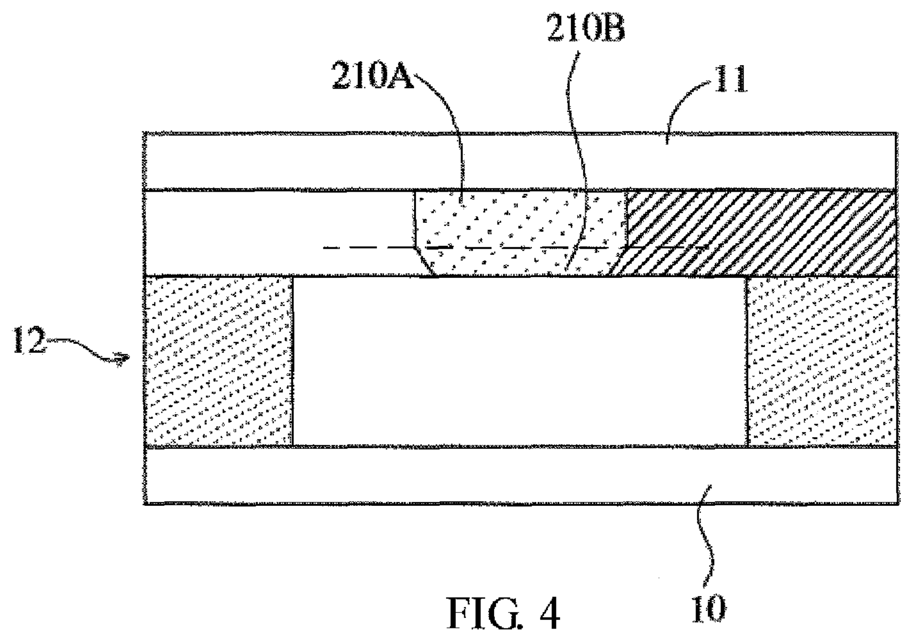
FIG. 4 is a partial cross-sectional view, taken along the line AA in FIG. 2, of the liquid crystal display apparatus according to a second embodiment of the present invention.

With reference to FIG. 4, FIG. 4 is a partial cross-sectional view, taken along the line AA in FIG. 2, of the liquid crystal display apparatus according to a second embodiment of the present invention. In this embodiment, the upper portion 210A of the cross section of the black matrix layer 21 has a larger rectangular shape; and the lower portion 210B has a trapezoidal shape, wherein a top base side of the trapezoidal shape is connected to the upper portion 210A. A length of the top base side of the trapezoidal shape is greater than that of a bottom base side of the trapezoidal shape.

Figure 5:
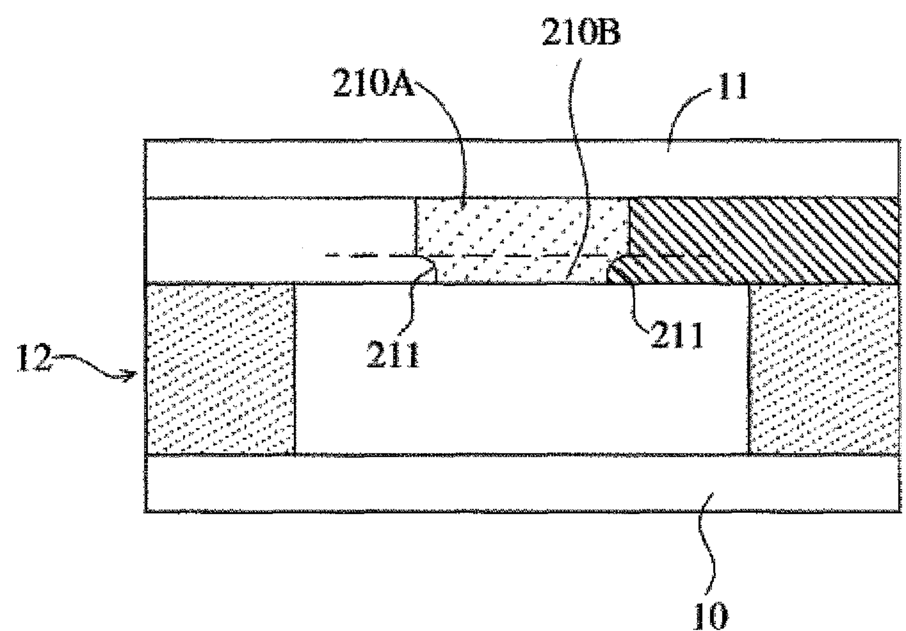
FIG. 5 is a partial cross-sectional view, taken along the line AA in FIG. 2, of the liquid crystal display apparatus according to a third embodiment of the present invention.

With reference to FIG. 5, FIG. 5 is a partial cross-sectional view, taken along the line AA in FIG. 2, of the liquid crystal display apparatus according to a third embodiment of the present invention. In this embodiment, the lower portion 210B of the cross section of the black matrix layer 21 has an arc-shaped concave 211 on both sides.

Figure 6:
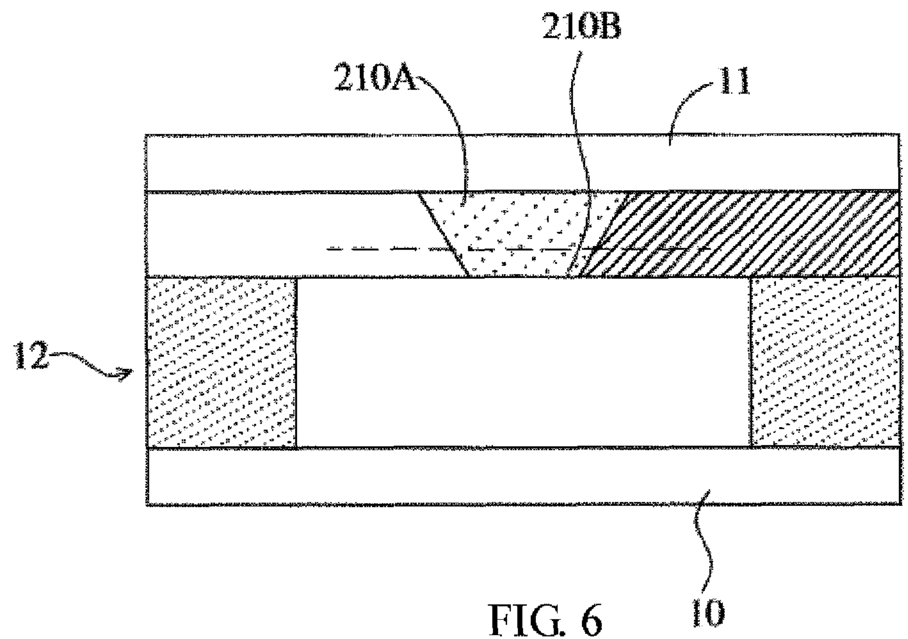
FIG. 6 is a partial cross-sectional view, taken along the line AA in FIG. 2, of the liquid crystal display apparatus according to a fourth embodiment of the present invention.

With reference to FIG. 6, FIG. 6 is a partial cross-sectional view, taken along the line AA in FIG. 2, of the liquid crystal display apparatus according to a fourth embodiment of the present invention. In this embodiment, the upper portion 210A and the lower portion 210B of the cross section of the black matrix layer 21 together are a trapezoidal shape as a whole.

Figure 7:
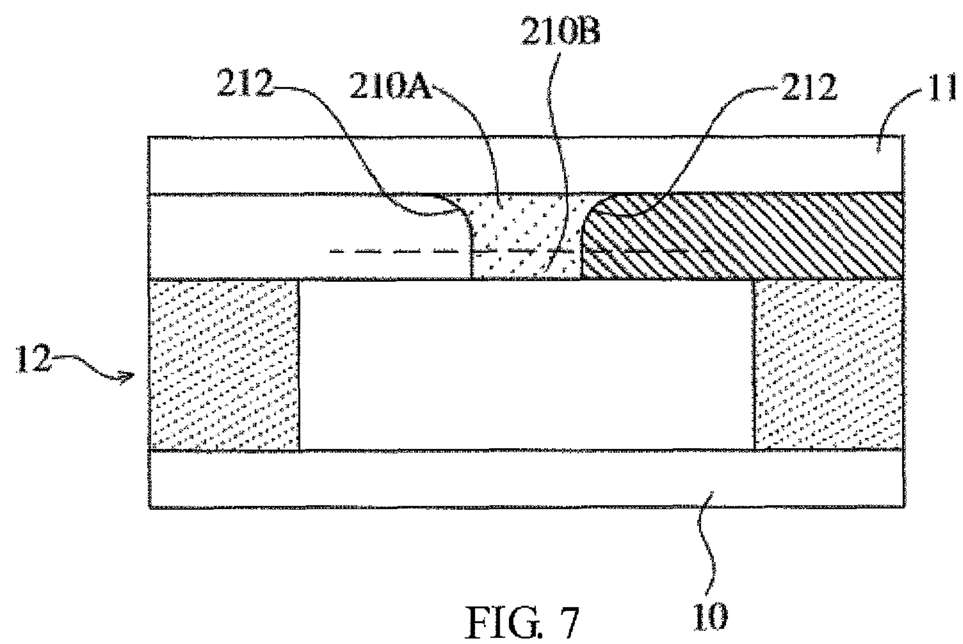
FIG. 7 is a partial cross-sectional view, taken along the line AA in FIG. 2, of the liquid crystal display apparatus according to a fifth embodiment of the present invention.

With reference to FIG. 7, FIG. 7 is a partial cross-sectional view, taken along the line AA in FIG. 2, of the liquid crystal display apparatus according to a fifth embodiment of the present invention. In this embodiment, the upper portion 210A of the cross section of the black matrix layer 21 has an arc-shaped concave 212 on both sides; and the lower portion 210B has a rectangular shape.

In conclusion, the present invention is mainly to form a black matrix layer between adjacent color filter units, wherein the black matrix, in cross section, has an upper portion and a lower portion with different widths. In this way, compared with conventional color filters, the lower portion which protrudes outward with respect to the upper portion is able to block light coming from the other adjacent pixel areas under large viewing angles, and thereby improving color shift under large viewing angles and enhancing display quality of liquid crystal display apparatus.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A color filter comprising:

a plurality color filter units being arranged in a matrix form, wherein the position of each color filter unit corresponds to that of a sub-pixel unit of a liquid crystal display apparatus; and a black matrix layer being formed between the color filter units, wherein a cross section of the black matrix layer between two adjacent color filter units has an upper portion with a larger width and a lower portion with a smaller width; wherein the cross section of the black matrix layer between two adjacent color filter units have a top surface being coplanar with top surfaces of the adjacent color filter units; wherein the upper portion of the cross section of the black matrix layer has a larger rectangular shape; and the lower portion has a trapezoidal shape; a top base side of the trapezoidal shape is connected to the upper portion, wherein a length of the top base side of the trapezoidal shape is greater than that of a bottom base side of the trapezoidal shape; wherein two edges of the top base side of the trapezoidal shape are aligned with two edges of the upper portion; the color filter units are arranged into a plurality of rows, where in each row of the color filter units, the cross section of the black matrix layer between two adjacent color filter units has the upper portion and the lower portion; the color filter units include red color filter units, blue color filter units, and green color filter units; and the red color filter units, the blue color filter units and the green color filter units are alternately arranged along a row direction.

2. A color filter comprising:

a plurality color filter units being arranged in a matrix form, wherein the position of each color filter unit corresponds to that of a sub-pixel unit of a liquid crystal display apparatus; and a black matrix layer being formed between the color filter units, wherein a cross section of the black matrix layer between two adjacent color filter units has an upper portion with a larger width and a lower portion with a smaller width; wherein the cross section of the black matrix layer between two adjacent color filter units have a top surface being coplanar with top surfaces of the adjacent color filter units; wherein the upper portion of the cross section of the black matrix layer has a larger rectangular shape; and the lower portion has a trapezoidal shape; a too base side of the trapezoidal shape is connected to the upper portion, wherein a length of the top base side of the trapezoidal shape is greater than that of a bottom base side of the trapezoidal shape; wherein two edges of the top base side of the trapezoidal shape are aligned with two edges of the upper portion.

3. The color filter as claimed in claim 2, wherein the color filter units are arranged into a plurality of rows, where in each row of the color filter units, the cross section of the black matrix layer between two adjacent color filter units has the upper portion and the lower portion.

4. The color filter as claimed in claim 2, wherein the color filter units include red color filter units, blue color filter units, and green color filter units; and the red color filter units, the blue color filter units and the green color filter units are alternately arranged along a row direction.

5. A liquid crystal display apparatus comprising: a first substrate and a second substrate mounted opposite each other; a liquid crystal layer mounted between the first substrate and the second substrate; and a color filter mounted on the second substrate; wherein the color filter includes:

a plurality color filter units being arranged in a matrix form, wherein the position of each color filter unit corresponds to that of a sub-pixel unit of a liquid crystal display apparatus; and a black matrix layer being formed between the color filter units, wherein a cross section of the black matrix layer between two adjacent color filter units has an upper portion with a larger width and a lower portion with a smaller width; wherein the cross section of the black matrix layer between two adjacent color filter units have a top surface being coplanar with top surfaces of the adjacent color filter units; wherein the upper portion of the cross section of the black matrix layer has a larger rectangular shape; and the lower portion has a trapezoidal shape; a top base side of the trapezoidal shape is connected to the upper portion, wherein a length of the top base side of the trapezoidal shape is greater than that of a bottom base side of the trapezoidal shape; wherein two edges of the top base side of the trapezoidal shape are aligned with two edges of the upper portion.

* * * * *